March 11, 1930.  A. KASCHTOFSKY  1,750,523
NUT LOCKING DEVICE
Filed May 15, 1928

Inventor:
A. Kaschtofsky

Patented Mar. 11, 1930

1,750,523

UNITED STATES PATENT OFFICE

ALOIS KASCHTOFSKY, OF PRAGUE, CZECHOSLOVAKIA

NUT-LOCKING DEVICE

Application filed May 15, 1928. Serial No. 277,862.

Nut locking devices of the most divergent types are already known, and among them, the type in which the locking of the nut is effected by a slip-on sleeve pressed into notches in the bolt, or by tongues of the slip-on sleeve bearing against an annular groove provided in the bolt. In addition, slip-on sleeves are known in which holes are provided and through which pins are inserted for the purpose of locking the nut.

These known nut-locking devices, in addition to the many known disadvantages, also possess the disadvantage that, if for any reason the nut requires to be tightened or loosened, the locking device must in most cases first be removed from the nut and again replaced when the adjustment has been effected. Many locking devices have the additional disadvantage that the nut must assume a predetermined position to enable the locking element, for example the pin, to be inserted in the bore in the bolt. This, however, is troublesome and involves considerable loss of time.

The object of the present invention is to provide a nut-locking device, which does not require to be removed when the nut is adjusted and which, for effecting the locking, only requires one movement of the hand. The invention consists essentially in the fact that a sleeve which surrounds the nut and extends at its lower end below the nut and clasps the latter by means of lugs, is provided at the top or upper part with an annular series of teeth parallel to the axis of the bolt, which teeth lie tightly against the thread. One or more of these narrow teeth, for the purpose of locking the nut, are bent into a longitudinal slot or slots, in the bolt, each tooth being bent into the slot with which it happens to become in register.

Figure 1:
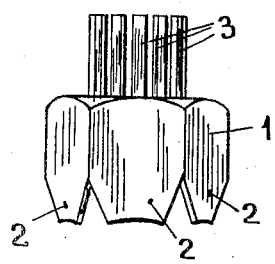
Figure 2:
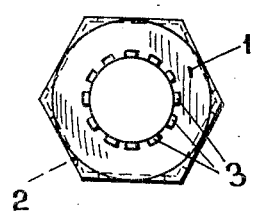
Figure 3:
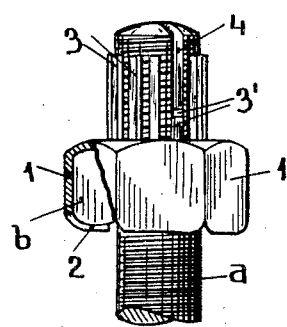

In the accompanying drawing an embodiment of the invention is shown diagrammatically by way of example. Figure 1 is a side elevation of a nut-locking device according to the invention. Figure 2 is a plan view thereof. Figure 3 shows an analogous locking device in combination with a nut to be locked with bolt.

The nut locking device according to the invention consists of a drawn or stamped sheet iron sleeve 1, having the cross-sectional shape and dimensions of the nut $b$ to be locked, accurately fitting the latter and extending downwardly beyond the lower edge of same. The downwardly extending portion is in the form of lugs 2 having tapered edges so as not to overlap each other when bent under to engage the underside of the nut. The upper part of this sleeve extends cap-like over the top surface of the nut and has a central aperture corresponding in diameter to the bolt $a$, and a tubular upward extension piece which fits round the bolt $a$. This extension piece, round the whole of its periphery, is divided by longitudinal incisions to provide an annular series of narrow teeth 3.

When the nut has been provided with the sleeve, the projecting portions 2 of the latter are bent round under the nut $b$, the nut is screwed onto the bolt and tightened up by means of a spanner. The bolt $a$ has a diametrical slot 4 and the particular teeth 3' located in register with the opposite sides of the slot 4 are bent by means of a flat tool (a screwdriver or the like) into the slot. In this manner they form an immovable connection between the bolt and the nut enclosed in the sleeve.

This locking device presents the great advantage that the sleeve forms a unit with the nut and the assemblage can be screwed onto the bolt and tightened up with a spanner in the same way as an ordinary nut. Thus the fixing of the locking device requires only a single movement of the hand, to bend the small teeth on both sides into the slot in the bolt. The nut can be supplied already rigidly fixed in the sleeve and the securing of the sleeve in place on the nut can be effected mechanically, in which case the slits in the downwardly projecting portion 2 of the sleeve 1 can be dispensed with.

A further important advantage resides in the fact that the locking means can be released, by lifting the teeth which have been bent into the slot in the bolt, and the nut together with the sleeve can be loosened or tightened without the necessity of removing the sleeve, whereupon it is only necessary to bend the vertical teeth on both sides of the bolt slot back again into the latter, in order to again produce the locking action.

What I claim is:—

1. A device for securing nuts to bolts, comprising a hollow centrally apertured body portion fitting cap-like on the top and sides of the nut, and an upwardly-extending tubular piece composed of an annular series of longitudinal bendable teeth, whereby diametrically opposite ones of said teeth registering with a diametric slot in the bolt to which the nut is applied can be bent into locking engagement with said slot.

2. A device for securing nuts to bolts, comprising a hollow centrally apertured body portion fitting cap-like on the top and sides of the nut, an upwardly-extending tubular piece composed of an annular series of longitudinal bendable teeth, whereby diametrically opposite ones of said teeth registering with the opposite sides of a diametric slot in the bolt can be bent into locking engagement in said slot, and downwardly-extending bendable lugs for embracing the undersurface of the nut by being bent into position thereagainst.

3. A device for securing nuts to bolts, comprising a hollow centrally apertured body portion fitting cap-like on the top and sides of the nut, an upwardly-extending tubular piece composed of an annular series of longitudinal bendable teeth, whereby diametrically opposite ones of said teeth registering with the opposite sides of a diametric slot in the bolt can be bent into locking engagement in said slot, and downwardly-extending bendable lugs having tapered edges, whereby the lugs when bent inwards to embrace the undersurface of the nut do not overlap one another.

In testimony whereof I have signed my name to this specification.

Dr. Ing. ALOIS KASCHTOFSKY.